(12) United States Patent
Deng

(10) Patent No.: US 8,587,972 B2
(45) Date of Patent: Nov. 19, 2013

(54) APPARATUS AND SYSTEM FOR TRANSFORMER FREQUENCY CONTROL

(76) Inventor: Qi Deng, San Jose, CA (US)

( * ) Notice: Subject to any disclaimer, the term of this patent is extended or adjusted under 35 U.S.C. 154(b) by 369 days.

(21) Appl. No.: 13/011,817

(22) Filed: Jan. 21, 2011

(65) Prior Publication Data

US 2012/0188795 A1 Jul. 26, 2012

(51) Int. Cl.
*H02M 3/24* (2006.01)
(52) U.S. Cl.
USPC ............................................. 363/95; 363/25
(58) Field of Classification Search
USPC ......... 363/16–26, 35, 37, 39, 95, 97, 98, 126, 363/132; 323/207, 299, 358, 906
See application file for complete search history.

(56) References Cited

U.S. PATENT DOCUMENTS

| | | | | |
|---|---|---|---|---|
| 4,375,662 A | * | 3/1983 | Baker | 363/95 |
| 4,494,180 A | * | 1/1985 | Streater et al. | 363/37 |
| 5,969,954 A | * | 10/1999 | Zaitsu | 363/16 |
| 6,919,714 B2 | * | 7/2005 | Delepaut | 323/284 |
| 7,193,872 B2 | * | 3/2007 | Siri | 363/95 |

* cited by examiner

*Primary Examiner* — Rajnikant Patel
(74) *Attorney, Agent, or Firm* — Ariel S. Bentolila; Bay Area IP Group, LLC

(57) ABSTRACT

An apparatus and a system include a multiplier circuit for receiving a sensed voltage and current of a of a load resistance coupled to a rectified voltage from a transformer's output whose input is from a DC-to-AC converter being supplied from a DC power generator having an internal resistance. The multiplier outputs a product of the sensed voltage and current. A differentiator circuit outputs a rate of change of the product. An integrator circuit outputs an integrated voltage indicating an accumulative rate of change of the product. A voltage-to-frequency converter circuit generates a voltage waveform having a frequency determined by the integrated voltage. A driver circuit uses the voltage waveform to output a control signal for controlling a frequency of the DC-to-AC power converter where the apparatus substantially matches an input resistance of the transformer to the internal resistance, thereby maximizing power transfer to the load resistance.

20 Claims, 3 Drawing Sheets

APPARATUS AND SYSTEM FOR TRANSFORMER FREQUENCY CONTROL

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates generally to converting unregulated electrical energy generated by a renewable power generator to regulated electrical energy consumable by a load. More particularly, the present invention identifies means to have a solar power generator, such as a solar cell, a solar panel and/or a solar array, output unregulated electrical energy at its maximum power point by matching the load resistance to the internal resistance of the solar power generator.

BACKGROUND OF THE INVENTION

The typical energy conversation efficiency of today's commercially available renewable power generators is not much greater than 10%. Therefore, transferring the converted energy to the load in an efficient manner is of critical importance for producing economically viable renewable energy.

FIG. 1 illustrates a graph 100 depicting the electrical current versus voltage characteristics for a power generator and the resulting electrical power generated based upon the respective voltage and current supplied by the power generator.

For graph 100, an x-axis 102 represents the voltage supplied by the power generator in units of Volts, a first y-axis 104 represents the current supplied by the power generator in units of Amperes and a second y-axis 106 represents the power supplied by the power generator in units of Watts. Graph 100 includes an IV function 108 and a dashed power function 110. IV function 108 represents the current versus voltage characteristics of the power supply. IV function 108 includes a point 112, a point 114 and a point 116. Dashed power function 110 represents the electrical power generated by the power supply based upon the current versus voltage characteristics of the power supply. Dashed power function 110 includes a point 118, a point 120 and a point 122. Point 112 of IV function 108 represents a cutoff point where a value of zero voltage may be produced and thereby a zero quantity of power may be produced as represented by point 118 of dashed power function 110. Point 116 of IV function 108 represents a cutoff point where a value of zero current may be produced and thereby a zero quantity of power may be produced as represented by point 122 of dashed power function 110. Point 114 of IV function 108 represents a position of bend for IV function 108 and coincides on x-axis 102 with a maximum value for dashed power function 110 as denoted by point 120. Point 120 represents the Maximum Power Point (MPP) for the power generator and a dashed line 124 extends vertically downward from point 114 of IV function 108 to a point 126 on x-axis 102 and through point 120 of dashed power function 110. Point 126 represents the value of the voltage exhibited by the power generator at MPP. A dashed line 128 initiates at point 114 and extends horizontally to a point 130 of first y-axis 104. Point 130 represents the value of the current generated by the power generator at MPP. Dashed line 132 initiates at point 120 of dashed power function 110 and extends horizontally to a point 134 of second y-axis 106. Point 134 represents the value of the power generated by the power generator at MPP.

It may be observed that the power output of a renewable power generator peeks at a Maximum Power Point (MPP), denoted as point 120 on the power output curve (dashed power function 110), at which point the time rate of change of the power generated by the renewable power generator is equal to 0 (dP/dt=0). Therefore, methods of Maximum Power Point Tracking (MPPT) and maintaining the operation of a renewable power generator at or near the MPP are needed.

Prior art exists for methods of MPPT. The majority of prior art focus on taking a snapshot of the current and voltage output of the solar power generator at a time point, then calculating the output power, which is the product of the current and voltage, at that time point. This process repeats itself periodically, and the generated power calculated at a delayed point in time is compared to the generated power calculated at a time point that is non-delayed. If the power calculated at the non-delayed point in time is higher than the power calculated at the delayed point in time, the renewable power generator is operating to the left of the MPP or point 120 of the power output curve, denoted as dashed power function 110, and adjustment may be required to be performed in order to modify the operating point of the renewable power generator on the power output curve, until it coincides with the MPP located at point 120. If the power calculated at the non-delayed point in time is lower than the power calculated at the delayed point in time, the renewable power generator is in operation to the right side of the MPP or point 120 on the power output curve, denoted as dashed power function 110, and adjustment may be required to be performed in order to modify the operating point on the power output curve, until it coincides with the MPP.

The prior art discussed previously typically requires sophisticated circuits and digital intelligence, such as microprocessors and memory units to complete all necessary MPPT and output power adjustment operations. Furthermore, because of the non-continuous nature of digital electronics, it may be inefficient with respect to time for the operating point of the renewable power generator to converge to MPP.

An easier prior art approach, over the prior art approach discussed previously, does not utilize complicated, and potentially expensive digital components and takes advantage that, at the MPP on the output power curve, the time rate of change for the power generated by the renewable power generator is equal to 0 also denoted as dP/dt=0. One of the examples is given by U.S. Pat. No. 6,919,714, which presents a method of monitoring the direction of the time rate of change for the power generated. When the direction of the time rate of change is identified, the relative position of the MPP is known, and methods of making the renewable power generator operate at or near the MPP can therefore be implemented.

One of the more effective prior art methods for configuring a renewable power generator to operate at or near the MPP is to manipulate the load resistance so that it matches the internal resistance of the renewable power generator. It can be mathematically shown that a renewable power generator operates at MPP when its internal resistance equals to the load resistance. Therefore, some prior art implementations present methods of configuring the renewable power generator to operate at the MPP by adjusting the load resistance so that it continuously matches the internal resistance of the renewable power generator.

A prior art example illustrated in U.S. Pat. No. 4,494,180, presents a method of adjusting the output load resistance in order to match the internal resistance of a renewable power generator. For this case, the load is an AC electrical motor, which is driven by a DC/AC inverter powered by a renewable power generator. The resistance of the electrical motor is a function of the frequency of the AC power. As such, matching the resistance of the electrical motor and internal resistance of the renewable power generator is achieved by altering the frequency of the AC power, and the frequency of the AC power is adjusted according to the location on the output power curve where the renewable power generator is operating. This operating point is tracked by monitoring the direction of time rate of change for the power generated, denoted as dP/dt, by the renewable power generator. When the frequency of the AC power is adjusted to a value such that the direction for the time rate of change for the power generated is equal to 0, the resistance of the electrical motor is in a condition of matching the internal resistance of the renewable power generator, the renewable power generator operates at the MPP, and as a result the generation of power is maximized.

However, the prior art method previously mentioned is limited in that, only a specific load type, such as an AC electrical motor in the case of U.S. Pat. No. 4,494,180, can benefit from the method, and therefore more generic methods are needed to accommodate a diversity of load types. Furthermore, prior art implementations do not offer detailed implementations that specify methods of MPPT, and more importantly, methods of adjusting the load resistance based on the results of the MPPT in order to match the internal resistance of the renewable power generator.

In view of the foregoing, there is a need for improved techniques for enabling renewable power generators to operate at MPP and for improved techniques of MPPT.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
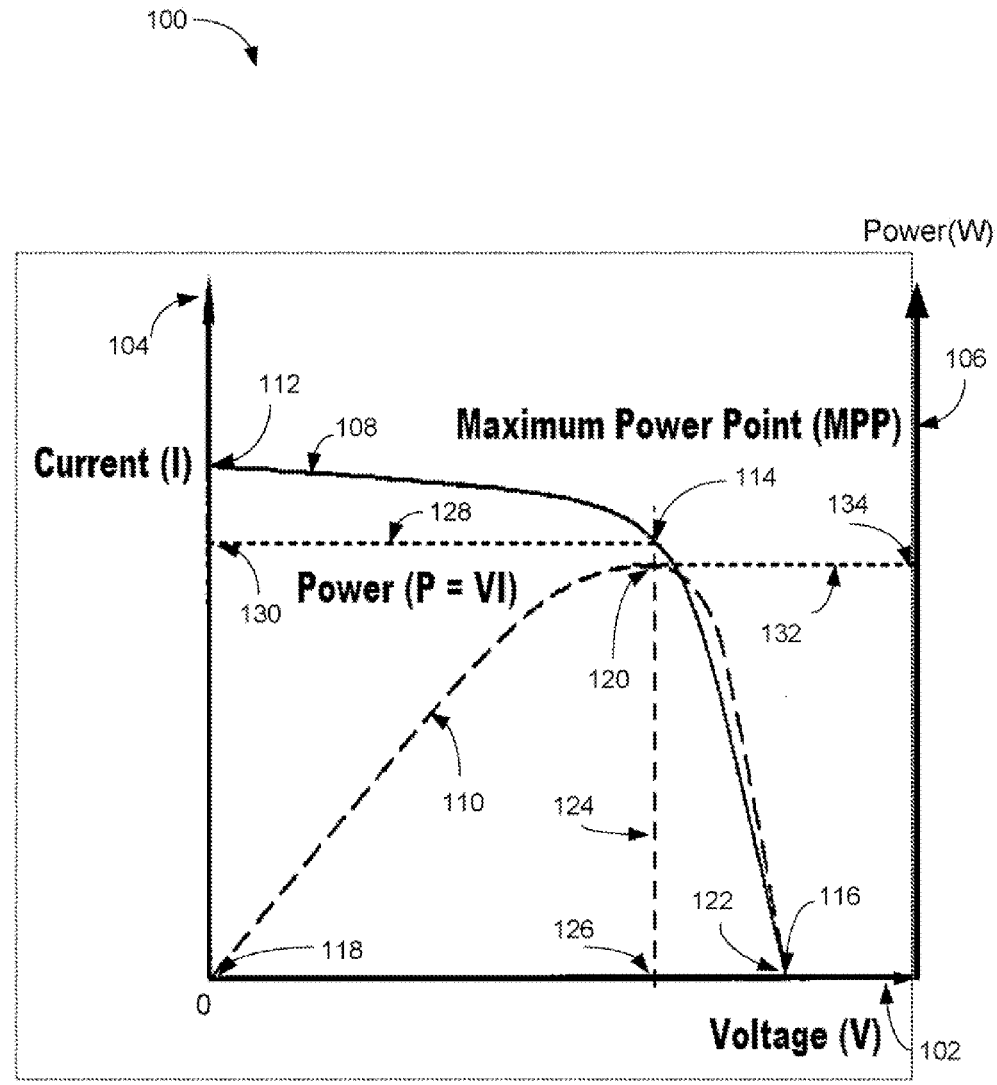
FIG. 1 illustrates a graph depicting the current versus voltage characteristics for a power generator and the resulting electrical power generated based upon the respective voltage and current supplied by the power generator.

Unless otherwise indicated illustrations in the figures are not necessarily drawn to scale.

SUMMARY OF THE INVENTION

To achieve the forgoing and other objects and in accordance with the purpose of the invention, an apparatus and system for transformer frequency control is presented.

In one embodiment an apparatus includes means for receiving a sensed voltage of a voltage applied to a load resistance and a sensed current of a current passing through the load resistance where the voltage is a rectified voltage from a transformer's output whose input is from a DC-to-AC power converter being supplied from a DC power generator having an internal resistance, the means being operable to output a product of the sensed voltage and the sensed current. Means receives the product and is operable for outputting a rate of change of the product. Means receives the rate of change and is operable for outputting an integrated voltage indicating an accumulative rate of change of the product. Means receives the integrated voltage and is operable for generating a voltage waveform having a frequency determined by the integrated voltage. Means receives the voltage waveform and is operable for using the voltage waveform to output a control signal for controlling a frequency of the DC-to-AC power converter where the apparatus substantially matches an input resistance of the transformer to the internal resistance, thereby maximizing power transfer to the load resistance.

In another embodiment an apparatus includes a multiplier circuit operable for receiving a sensed voltage of a voltage applied to a load resistance and a sensed current of a current passing through the load resistance where the voltage is a rectified voltage from a transformer's output whose input is from a DC-to-AC power converter being supplied from a DC power generator having an internal resistance, the multiplier being further operable to output a product of the sensed voltage and the sensed current. A differentiator circuit is coupled to the multiplier circuit and operable for outputting a rate of change of the product. An integrator circuit is coupled to the differentiator circuit and operable for outputting an integrated voltage indicating an accumulative rate of change of the product. A voltage-to-frequency converter circuit is coupled to the integrator circuit and operable for generating a voltage waveform having a frequency determined by the integrated voltage. A driver circuit is coupled to the voltage-to-frequency converter circuit and operable for using the voltage waveform to output a control signal for controlling a frequency of the DC-to-AC power converter where the apparatus substantially matches an input resistance of the transformer to the internal resistance, thereby maximizing power transfer to the load resistance.

In another embodiment a system includes a DC-to-AC power converter operable for receiving DC power from a power generator having an internal resistance and operable for outputting an AC power. A transformer is coupled to the DC-to-AC power converter and operable for outputting a transformed AC power. A rectifier circuit is coupled to the transformer and operable for outputting a rectified transformed AC power for application to a load resistance. Means senses a voltage on the load resistance and outputs the sensed voltage. Means senses a current through the load resistance and outputs the sensed current. A multiplier circuit is operable for receiving the sensed voltage and the sensed current, the multiplier being further operable to output a product of the sensed voltage and the sensed current. A differentiator circuit is coupled to the multiplier circuit and operable for outputting a rate of change of the product. An integrator circuit is coupled to the differentiator circuit and operable for outputting an integrated voltage indicating an accumulative rate of change of the product. A voltage-to-frequency converter circuit is coupled to the integrator circuit and operable for generating a voltage waveform having a frequency determined by the integrated voltage. A driver circuit is coupled to the voltage-to-frequency converter circuit and operable for using the voltage waveform to output a control signal for controlling a frequency of the DC-to-AC power converter where the system substantially matches an input resistance of the transformer to the internal resistance, thereby maximizing power transfer to the load resistance.

Other features, advantages, and objects of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

A first embodiment of the present invention will be described which provides means and methods for enabling a power generator to efficiently convert unregulated electrical energy to regulated electrical energy consumable by a load, to operate with a minimal time for convergence to MPP and to operate optimally with respect to power generation, transfer and consumption. Non-limiting examples of power generators include solar cells, solar panels, solar arrays, fuel cells, batteries and electrical generators. An H-bridge circuit may be connected to the power generator for converting direct current electrical power generated by power generator to alternating current electrical power in order to facilitate transfer of electrical power via a transformer. Primary winding of transformer may be connected to H-bridge circuit in order to receive alternating current electrical power from H-bride circuit in order to transfer electrical power from the primary winding of the transformer to the secondary winding of the transformer. Furthermore, transformer may operate to provide a means for the matching the resistance of the power generator with the load as presented by the transformer in order to affect efficient transfer of power from the power generator to its load. A rectifier circuit may be connected to the secondary wiring of transformer for receiving alternating current electrical power and provide conversion of alternating current electrical power to direct current electrical power. A load may be connected to rectifier circuit for consuming electrical power. A voltage sensing circuit may be connected to load in order to measure the amount of electrical voltage applied to load. A current sensing circuit may be connected to load in order to measure the amount of electrical current received by the load. A controller circuit may operate to receive an electrical voltage measurement from voltage sensing circuit and to receive an electrical current measurement from current sensing circuit. Controller circuit may operate to process received electrical voltage and current measurements and generate signals for controlling the frequency of operation for H-bridge circuit such that the resistance of the primary winding of the transformer matches the internal resistance of the power generator. The resistance of the primary winding of the transformer is a function of the frequency of the signal applied to the primary winding of the transformer. If the resistance of the primary winding of the transformer is greater than the internal resistance of the power generator, then controller circuit may operate to sense the condition of the resistance imbalance and decrease the frequency of operation for H-bridge circuit until the resistance of the primary winding of the transformer is equal to the internal resistance of the power generator. Conversely, if the resistance of the primary winding of the transformer is less than the internal resistance of the power generator, then controller circuit may operate to sense the condition of resistance imbalance and increase the frequency of operation of H-bridge circuit and increase the frequency of operation for H-bridge circuit until the resistance of the primary winding of the transformer is equal to the internal resistance of the power generator. If the resistance of the primary winding of the transformer is equal to the internal resistance of the power generator, then controller circuit may operate to sense the condition of equal resistance and may operate to maintain the status quo for the frequency of operation of H-bridge. When the resistance of the primary winding of the transformer is equal to the internal resistance of the power generator, the power generator may be considered as operating at conditions of MPP with a maximum amount of electrical power being transferred from power generator to load via H-bridge circuit, transformer and rectifier circuit.

Other embodiments of the present invention will be described which provides means and methods for enabling the operation of the controller circuit as described for the first embodiment in order to efficiently convert unregulated electrical energy to regulated electrical energy consumable by a load, to operate with a minimal time for convergence to MPP and to operate optimally with respect to power generation, transfer and consumption. Non-limiting examples of power generators include solar cells, solar panels, solar arrays, fuel cells, batteries and electrical generators. A multiplier circuit may operate to receive an electrical voltage measurement representing the voltage applied to the load and an electrical current measurement indicating the electrical current applied to the load. Multiplier circuit may operate to multiply the received electrical voltage and current measurements in order to derive an indication of the power being supplied to load. A differentiator circuit may receive a signal from multiplier circuit indicating an amount of power being supplied to load and operate to perform an analog differentiation for the received indication of power. A transconductance amplifier circuit may operate to receive an output voltage signal from differentiator circuit for conversion of the received voltage to an electrical current representing the received voltage and also a representation for the delivery of power from power generator to load as previously discussed with respect to differentiator circuit. An integrator circuit may operate to receive the electrical current from transconductance amplifier circuit and perform an analog integration of the received electrical current and supply an output voltage representing the integration of the received electrical current. The output voltage of integrator circuit may operate to indicate the condition of operation for power supply delivering electrical power to load. An increasing voltage generated by integrator circuit may operate to indicate delivery of power from power generator to load is operating such that the time rate of change of power supplied by power generator to load is greater than zero or $dP_L/dt>0$. A decreasing voltage generated by integrator circuit may operate to indicate delivery of power from power generator to load is operating such that the time rate of change of power supplied by power generator to load is less than zero or $dP_L/dt<0$. A constant value of voltage generated by integrator circuit may operate to indicate the delivery of power from power generator to load is operating such that the time rate of change of power supplied by power generator to load is equal to zero or $dP_L/dt=0$. A differential amplifier circuit may operate to receive the signal supplied by integrator circuit. The output voltage of differential amplifier circuit may operate to indicate the condition of operation for power supply delivering electrical power to load. A decreasing voltage generated by differential amplifier circuit may operate to indicate delivery of power from power generator to load is operating such that the time rate of change of power supplied by power generator to load is greater than zero or $dP_L/dt>0$. An increasing voltage generated by differential amplifier circuit may operate to indicate delivery of power from power generator to load is operating such that the time rate of change of power supplied by power generator to load is less than zero of time or $dP_L/dt<0$. A constant value of voltage generated by differential amplifier circuit may operate to indicate the delivery of power from power generator to load is operating such that the time rate of change of power supplied by power generator to load is equal to zero or $dP_L/dt=0$. A voltage-to-frequency converter circuit may operate to receive the voltage signal supplied by differential amplifier circuit for conversion to a frequency representation. For a decreasing voltage supplied by differential amplifier which represents a condition of $dP_L/dt>0$, the frequency generated by voltage-to frequency converter circuit increases. For an increasing voltage supplied by differential amplifier circuit which represents a condition of $dP_L/dt<0$, the frequency generated by voltage-to-frequency converter circuit decreases. For a constant value of voltage supplied by differential amplifier, the frequency generated by voltage-to-frequency circuit maintains an unchanged or constant frequency. An H-bridge driver circuit may receive the signal from voltage-to-frequency converter circuit and operate to divide the received signal by two and also to provide two output signals which are complementary. H-bridge driver circuit divides the received signal by two in order to deliver control signals with a 50% duty cycle to H-bridge circuit. When power supplied by power generator to load is such that the rate of change of the power supplied divided by the rate of change of time is greater than zero ($dP_L/dt>0$), controller circuit may operate to increase the frequency of the signal delivered by H-bridge driver circuit in order to increase the frequency of the signal delivered to the H-bridge circuit and to the primary winding of the transformer thereby increasing the resistance of the primary winding of the transformer. Furthermore, the frequency of the signal delivered by controller circuit via H-bridge driver circuit may operate to continue to increase until the rate of change of the power delivered divided by the rate of change of time is equal to 0 ($dP_L/dt=0$). When power supplied by power generator to load is such that the rate of change of the power supplied divided by the rate of change of time is less than zero ($dP_L/dt<0$), controller circuit may operate to decrease the frequency of the signal delivered by H-bridge circuit driver in order to decrease the frequency of the signal delivered to the H-bridge circuit and to the primary winding of the transformer. Furthermore, the frequency of the signal delivered by controller circuit via H-bridge driver circuit may operate to continue to decrease until the rate of change of the power delivered divided by the rate of change of time is equal to 0 ($dP_L/dt=0$). When the rate of change of the power delivered divided by the rate of change of time is equal to 0 ($dP_L/dt=0$), the power supplied by power generator to load is at the MPP, representing a condition for maximum delivery of power from the power generator to the load.

Figure 2:
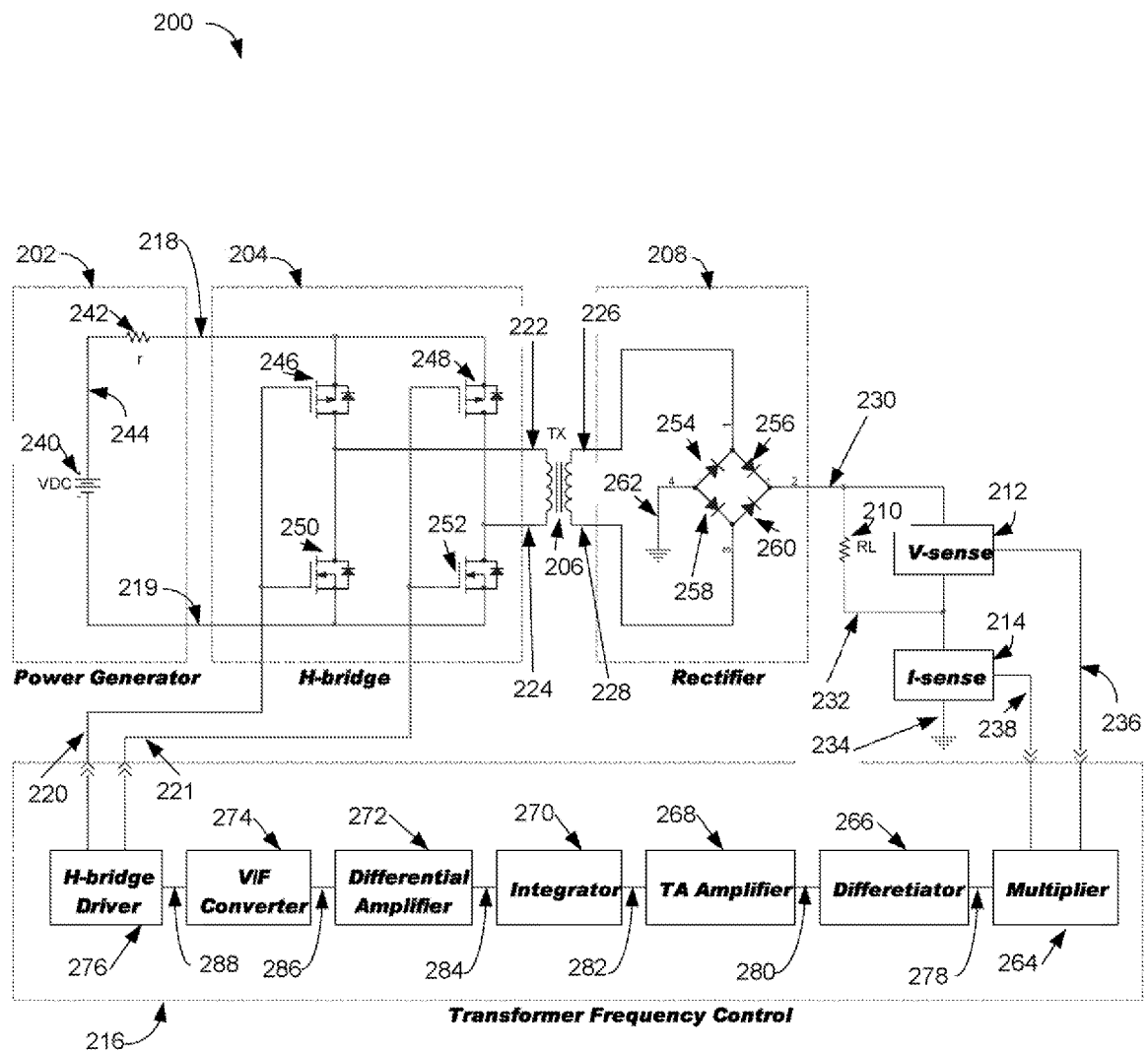
FIG. 2 illustrates a schematic diagram of a power system 200, an exemplary embodiment of the present invention.

FIG. 2 illustrates a schematic diagram of a power system 200, an exemplary embodiment of the present invention.

Power system 200 includes a power generator 202, an H-bridge circuit 204, a transformer 206, a rectification circuit 208, a resistive load 210, a voltage sensing circuit 212, a current sensing circuit 214 and a frequency control circuit 216.

Power generator 202 may operate to generate direct current electrical power. H-bridge circuit 204 may operate to receive direct current electrical power generated by power generator 202 for conversion to alternating current electrical power. Transformer 206 may operate to transfer received alternating electrical energy from its primary winding to its secondary winding. Rectification circuit 208 may operate to receive the alternating current generated by the secondary windings of transformer 206 and generate direct current electrical power. Resistive load 210 may operate to receive and use the direct current electrical power generated by rectification circuit 208. Voltage sensing circuit 212 may operate to provide a real time indication of the electrical voltage applied to resistive load 210. Current sensing circuit 214 may operate to provide a real time indication of the electrical current flowing through resistive load 210. Voltage sensing circuit 212 and current sensing circuit 214 are common elements in the art and as such no detailed circuit implementations are provided. Frequency control circuit 216 may operate to receive and process indications of electrical voltage provided by voltage sensing circuit 212 and by current sensing circuit 214 for providing control of the frequency of the electrical power generated by H-bridge circuit 204.

H-bridge circuit 204 may be configured to receive a signal 218 and a signal 219 from power generator 202 and to receive a signal 220 and a signal 221 from frequency control circuit 216. A first terminal of transformer 206 may be configured to receive a signal 222 from H-bridge circuit 204 and a second terminal of transformer 206 may be configured to receive a signal 224 from H-bridge circuit 204. Rectification circuit 208 may be configured to receive a signal 226 and a signal 228 from a third terminal and a fourth terminal of transformer 206, respectively. A first terminal of resistive load 210 may be configured to receive a signal 230 from rectification circuit 208. Voltage sensing circuit 212 may be configured to receive signal 230 from rectification circuit 208 and a signal 232 from a second terminal of resistive load 210. Current sensing circuit 214 may be configured to receive signal 232 from second terminal of resistive load 210 and be connected to electrical ground via a signal 234. Frequency control circuit 216 may be configured to receive a signal 236 from voltage sensing circuit 212 and a signal 238 from current sensing circuit 214.

Power generator 202 includes a direct current power supply 240 and an internal resistance 242. A first terminal of internal resistance 242 may be configured to receive a signal 244 from a positive terminal of direct current power supply 240. A second terminal of internal resistance 242 may be connected to signal 218 which may operate to provide an external connection from power generator 202. Negative terminal of direct current power supply 240 may be connected to signal 219 which may operate to provide an external connection from power generator 202.

Power generator 202 may operate to provide direct current electrical power with a voltage denoted as $V_{DC}$. Non-limiting sources for power generated by power generator 202 include solar, fuel cell, battery and electrical generator. Direct current electrical power may be generated by direct current power supply 240 with an internal resistance denoted as internal resistance 242 and with a resistive value denoted as r.

H-bridge circuit 204 includes a transistor 246, a transistor 248, a transistor 250 and a transistor 252. As an example, but not limited to, transistor 246 and transistor 248 may be configured as P-channel MOSFETs (Metal Oxide Semiconductor Field-Effect Transistor). As an example, but not limited to, transistor 250 and transistor 252 may be configured as N-channel MOSFETs. Source terminal of transistor 246 may be configured to receive signal 218 from second terminal of internal resistance 242 of power generator 202. Gate terminal of transistor 246 may be configured to receive signal 220 from frequency control circuit 216. Source terminal of transistor 248 may be configured to receive signal 218 from second terminal of internal resistance 242 of power generator 202. Gate terminal of transistor 248 may be configured to receive signal 221 from frequency control circuit 216. Source terminal of transistor 250 may be configured to receive signal 219 provided by negative terminal of direct current power supply 240 of power generator 202. Gate terminal of transistor 250 may be configured to receive signal 220 from frequency control circuit 216. Source terminal of transistor 252 may be configured to receive signal 219 provided by negative terminal of direct current power supply 240 of power generator 202. Gate terminal of transistor 252 may be configured to receive signal 221 from frequency control circuit 216. Drain terminal of transistor 246 and drain terminal of transistor 250 may be connected to generate signal 222 for providing external connection for H-bridge circuit 204. Drain terminal of transistor 248 and drain terminal of transistor 252 may be connected to generate signal 224 for providing external connection for H-bridge circuit 204.

H-bridge circuit 204 may operate to convert direct current electrical power to alternating current electrical power. High side transistors as denoted by transistor 246 and transistor 248 may be configured as, but not limited to, P-channel MOSFET devices. Low side transistors as denoted by transistor 250 and 252 may be configured as, but not limited to, N-channel MOSFET devices. Transistor 246 and transistor 252 may be configured or considered as pairs. Transistor 248 and transistor 250 may be configured or considered as pairs. The paired transistors of transistor 246 and transistor 252 may operate or actuate simultaneously. The paired transistors of transistor 248 and transistor 250 may operate or actuate simultaneously. The pair of transistor 246 and transistor 252 and the pair of transistor 248 and transistor 250 may operate or actuate in an alternating fashion. For example, for a first case of an actuated transistor 246 and transistor 252 and non-actuated transistor 248 and transistor 250, H-bridge circuit 204 may operate to provide electrical power from power generator 202 to transformer 206 in a fashion which is non-inverted. In contrast, for a second case of a non-actuated transistor 246 and transistor 252 and an actuated transistor 248 and transistor 250, H-bridge circuit 204 may also operate to provide electrical power from power generator 202 to transformer 206, albeit via an inverted polarity than provided by the previously mentioned first case. The durations for the actuation of the transistor pairs may be a 50% duty cycle, i.e. the transistor pairs may be configured to be actuated for an equal amount of time and on an alternating basis.

The first terminal of the primary winding for transformer 206 may be configured to receive signal 222 generated from H-bridge circuit 204. A second terminal of primary winding for transformer 206 may be configured to receive signal 224 generated from H-bridge circuit 204.

H-bridge circuit 204 may operate to convert direct current electrical power to alternating current electrical power. The alternating current electrical power provided by H-bridge circuit 204 may then be delivered to resistive load 210 in an efficient manner when provided via transformer 206. The frequency of the alternating current electrical power generated by H-bridge circuit 204 may be determined by the actuation frequency as provided by transistor 246, transistor 248, transistor 250 and transistor 252. For a first case of an actuated transistor 246 and transistor 252 pair, electrical current traverses from power generator 202, then traverses through transistor 246, then traverses through transformer 206 by entering first terminal of transformer 206 and exiting via second terminal of transformer 206, then traverses through transistor 252 and then lastly returns to power generator 202. For a second case of an actuated transistor 248 and transistor 250 pair, electrical current traverses from power generator 202, then traverses through transistor 248, then traverses through transformer 206 by entering second terminal of transformer 206 and exiting via first terminal of transformer, then traverses through transistor 250 and then lastly returns to power generator 202. The alternation of actuating the transistor pairs results in the generation of an alternating electrical current. The frequency of the alternation of the transistor pairs may be controlled by frequency control circuit 216 with frequency of alternation denoted as $f_{HB}$. The alternating current generated on the secondary winding of transformer 206 may also have a frequency of $f_{HB}$.

Rectification circuit 208 includes a diode 254, a diode 256, a diode 258 and a diode 260. Anode of diode 254 may be configured for connection to the anode of diode 258 and to electrical ground via a signal 262. Cathode of diode 254 may be configured for connection to the anode of diode 256 and to receive signal 226 provided by a first terminal of the secondary winding of transformer 206. Cathode of diode 258 may be configured for connection to the anode of diode 260 and to receive signal 228 provided by a second terminal of the secondary winding of transformer 206. Cathode of diode 256 may be configured for connection to the cathode of diode 260 and to provide signal 230 for connection externally to rectification circuit 208.

Rectification circuit 208 may operate to convert alternating electrical current to a direct current. Rectification circuit 208 may commonly be referred to in the art as a full-bridge rectifier.

For the case of a purely resistive load for resistive load 210, the following mathematical equation may be derived for the primary winding impedance of transformer 206:

$$Z_P = \omega^2 M^2 R_L/(R_L^2 + \omega^2 L_S^2) + j[\omega L_P - \omega^3 M^2 L_S/(R_L^2 + \omega^2 L_S^2)] \quad (1)$$

For equation (1), $\omega = 2\pi f$, $L_P$ may represent the self inductance for the primary winding of transformer 206, $L_S$ may represent the self inductance of the secondary winding of transformer 206, M may represent the mutual inductance for transformer 206, $R_L$ may represent the resistance of resistive load 210. For equation (1), the first term on the right hand side of the equation may be considered the resistance for the primary winding of transformer 206 and denoted as $R_P$ and the second term may be considered the reactance for the primary winding of transformer 206 and denoted as $X_P$. Equation 1 may now be written as:

$$Z_P = R_P + jX_P \quad (2a)$$

where:

$$R_P = \omega^2 M^2 R_L/(R_L^2 + \omega^2 L_S^2) \quad (2b)$$

$$X_P = \omega L_P - \omega^3 M^2 L_S/(R_L^2 + \omega^2 L_S^2) \quad (2c)$$

Power generator 202 may operate at maximum power point when the internal resistance of power generator 202, denoted as r, and the resistance of the primary winding of transformer 206, $R_P$, may be considered as equal in value as shown in equation (3) below:

$$r = R_P \quad (3)$$

With equal values for internal resistance r of power generator 202 and the resistance of the primary winding of transformer 206 $R_P$, electrical power may be transferred to resistive load 210 at a maximum.

As shown in equation (2b), $R_P$ may be considered a function of variable $\omega$, where $\omega$ may be considered a single variable for $R_P$. Furthermore, as may be observed by equation (2b), the value of $R_P$ increases with increasing $\omega$ indicating the resistance of the primary winding of transformer 206 may operate to increase with an increasing $\omega$ and an increasing frequency $f_{HB}$, as the following equation holds:

$$\omega = 2\pi f_{HB} \quad (4)$$

The electrical current presented on the secondary winding of transformer 206 may operate as an alternating current with a frequency identical to the frequency $f_{HB}$ experienced on the primary winding of transformer 206. The secondary winding of transformer 206 may be connected to resistive load 210 via rectification circuit 208, commonly referred to in the art as a full-bridge rectifier. Rectification circuit 208 may operate to convert alternating electrical current traversing through the secondary winding of transformer 206 to a direct electrical current for consumption by resistive load 210. The voltage differential experienced between the first and second terminals of resistive load 210 may be denoted as $V_L$ and the direct current traversing through resistive load 210 may be denoted as $I_L$. The electrical power transferred to resistive load 210 from the secondary winding of transformer via rectification circuit 208 may be denoted as $P_L = V_L I_L$.

It is well known in the art that transformers may be configured for providing efficient transfer of energy. For example, iron-core transformers may operate to transfer the bulk of energy applied to the primary winding of the transformer to the secondary winding of the transformer. As such, the electrical power transferred from power generator 202 to resistive load 210 may operate to yield electrical power efficiency in excess of 90% with the electrical power transferred to resistive load 210 closely tracking the electrical power generated by power generator 202.

Voltage $V_L$ as measured voltage sensing circuit 212 and current $I_L$ as measured by current sensing circuit 214 may be continuously monitored by frequency control circuit 216 in order to measure the amount of electrical power transferred to resistive load 210 and enable frequency control circuit 216 to effect an equivalent value for the primary winding resistance of transformer 206 and internal resistance 242.

Frequency control circuit 216 includes a multiplier circuit 264, a differentiator circuit 266, a transconductance amplifier circuit 268, an integrator circuit 270, a differential amplifier circuit 272, a voltage-to-frequency converter circuit 274 and an H-bridge driver circuit 276. Multiplier circuit 264 may be configured to receive signal 236 from voltage sensing circuit 212 and to receive signal 238 from current sensing circuit 214. Differentiator circuit 266 may be configured to receive a signal 278 from multiplier circuit 264. Transconductance amplifier circuit 268 may be configured to receive a signal 280 from differentiator circuit 266. Integrator circuit 270 may be configured to receive a signal 282 from transconductance amplifier circuit 268. Differential amplifier circuit 272 may be configured to receive a signal 284 from integrator circuit 270. Voltage-to-frequency converter circuit 274 may be configured to receive a signal 286 from differential amplifier circuit 272. H-bridge driver circuit 276 may be configured to receive a signal 288 from voltage-to-frequency converter circuit 274.

Frequency control circuit 216 may operate as a feedback loop from resistive load 210 back to transformer 206. Frequency control circuit 216 may operate to control and adjust the frequency of H-bridge circuit 204 which may also operate to control the frequency experienced by transformer 206. Frequency control circuit 216 may operate to control the frequency of transformer 206 such that the value for the resistance of the primary winding of transformer 206 may be considered equal, equivalent or matching to the value of the resistance for internal resistance 242.

Figure 3:
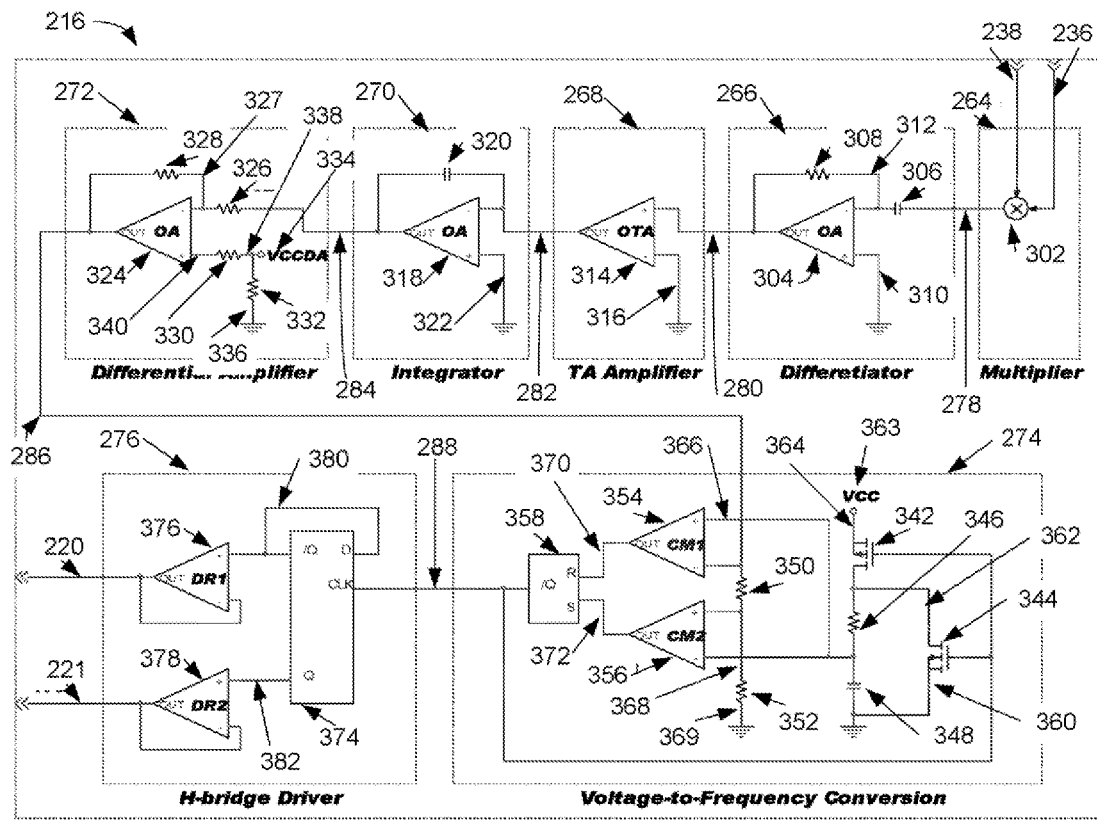
FIG. 3 presents a schematic diagram of frequency control circuit, an exemplary embodiment of the present invention, as illustrated in FIG. 2.

FIG. 3 presents a schematic diagram of frequency control circuit 216, an exemplary embodiment of the present invention, as illustrated in FIG. 2.

Frequency control circuit 216 includes multiplier circuit 264, differentiator circuit 266, transconductance amplifier circuit 268, integrator circuit 270, differential amplifier circuit 272, voltage-to-frequency converter circuit 274 and H-bridge driver circuit 276.

Multiplier circuit 264 includes an analog multiplier 302. Multiplier circuit 264 may be configured to receive signal 236 and signal 238 generated external to frequency control circuit 216. Analog multiplier 302 may operate to receive and multiply the two signals presented on its two input terminals in order to present an output signal representing the multiplication of the values as presented at the input terminals. Analog multiplier 302 may operate to receive a voltage $V_L$ as measured by voltage sensing circuit 212 and received via signal 236. Furthermore, analog multiplier 302 may operate to receive a voltage $I_L$ as measured by current sensing circuit 214 and received via signal 238. The multiplication of $V_L$ and $I_L$ performed by analog multiplier 302 may operate to generate an output as denoted by $P_{AM}$. The relationship of $P_{AM}$, $P_L$, $V_L$ and $I_L$ may be given as:

$$P_{AM} = \alpha P_L = \alpha V_L I_L \tag{5}$$

The value for the constant α may be considered intrinsic to the construction of analog multiplier 302. Analog multiplier 302 may be constructed such that α exhibits a value of unity. For a unity value for α, the value of $P_{AM}$ may be considered as equal to the value of $P_L$. However, a value of unity for α may not be considered as a requirement for embodiments of the present invention.

As illustrated in FIG. 1, at MPP as represented by point 120 of dashed power function 110, the following equation holds:

$$dP_{PG}/dt = 0 \tag{6a}$$

Equation (6a) indicates for condition of MPP, the rate of change of the power generated by power generator 202 divided by the rate of change for time equals zero.

Furthermore, for operation of power generator 202 to the left of dashed line 124 (FIG. 1), the following equation holds:

$$dP_{PG}/dt > 0 \tag{6b}$$

Equation (6b) indicates for conditions of power generator 202 operating to the left of dashed line 124 (FIG. 1), the rate of change of the power generated by power generator 202 divided by the rate of change for time may be considered greater than zero. Furthermore, equation (6b) indicates prior to the power generated by power generator 202 reaching MPP, power output increases as dashed power function 110 (FIG. 1) progresses.

Furthermore, for operation of power generator 202 to the right of dashed line 124 (FIG. 1), the following equation holds:

$$dP_{PG}/dt < 0 \tag{6c}$$

Equation (6c) indicates for conditions of power generator 202 operating to the right of dashed line 124 (FIG. 1), the rate of change of the power generated by power generator 202 divided by the rate of change for time may be considered less than zero. Equation (6c) indicates that once the power generated by power generator 202 reaches MPP, the power generated by power generator 202 decreases as dashed power function 110 (FIG. 1) progresses.

In prior discussion, it was established that transformer 206 (FIG. 2) may operate to transfer the power provided by power generator 202 (FIG. 2) to its primary windings to its secondary windings and to resistive load 210 (FIG. 2) in an efficient manner. As a result, the electrical power transferred to resistive load 210 (FIG. 2) closely tracks the power generated by power generator 202 (FIG. 2). Based on this the power dissipated by resistive load 210 (FIG. 2), as denoted by $P_L$, may be considered as approximately the value of the power generated by power generator 202 (FIG. 2), as denoted by PPG, or $P_L \approx P_{PG}$. Based on this, the following equations holds when power generator 202 (FIG. 2) operates at a condition of MPP:

$$dP_L/dt = 0 \tag{7a}$$

Equation (7a) indicates the rate of change for the power dissipated by resistive load 210 (FIG. 2) divided by the rate of change of time equals zero when power generator 202 (FIG. 2) operates at a condition of MPP.

Furthermore, the following equations holds when power generator 202 (FIG. 2) operates to the left of dashed line 124 (FIG. 1):

$$dP_L/dt > 0 \tag{7b}$$

Equation (7b) indicates the rate of change of the power dissipated by resistive load 210 (FIG. 2) divided by the rate of change of time may be considered greater than zero when power generator 202 (FIG. 2) operates to the left of dashed line 124.

Furthermore, the following equation holds when power generator 202 (FIG. 2) operates to the right side of dashed line 124 (FIG. 1):

$$dP_L/dt < 0 \tag{7c}$$

Equation (7c) indicates the rate of change for the power dissipated by resistive load 210 (FIG. 2) divided by the rate of change for time may be considered less than zero when power generator 202 (FIG. 2) operates to the right of dashed line 124 (FIG. 1).

Differentiator circuit 266 includes an operational amplifier 304, a capacitor 306 and a resistor 308. A first terminal of capacitor 306 may be configured to receive signal 278 generated by analog multiplier 302 of multiplier circuit 264. Inverting terminal of operational amplifier 304 may be configured to receive a signal 312 provided from a second terminal of capacitor 306 and a first terminal of resistor 308. Non-inverting terminal of operational amplifier 304 may be configured to be connected to electrical ground via a signal 310. A second terminal of resistor 308 may be configured to receive signal 280 provided by output of operational amplifier 304. Capacitor 306 may be configured to have a capacitance value as denoted $C_D$. Resistor 308 may be configured to have a resistance value as denoted by $R_D$.

Differentiator circuit 266 may be constructed as a classic analog differentiator with operation described per the following equation:

$$V_{AD} = -R_D C_D dP_{AM}/dt = -\alpha R_D C_D dP_L/dt = -\alpha \tau_D dP_L/dt \tag{8}$$

The variable $V_{AD}$ represents the output voltage generated by differentiator circuit 266 and $\tau_D = R_D C_D$.

Transconductance amplifier circuit 268 includes an operational transconductance amplifier 314. Non-inverting input of operational transconductance amplifier 314 may be configured to receive signal 280 from output terminal of operational amplifier 304. Inverting input of operational transconductance amplifier 314 may be configured for connection with electrical ground via a signal 316. Output terminal of operational transconductance amplifier 314 may be configured to supply an external signal to transconductance amplifier circuit 268 via signal 282.

The output current of operational transconductance amplifier 314 may be given as:

$$i_{gm} = gm(V+ - V-) \tag{9a}$$

$$i_{gm} = gm V_{AD} \tag{9b}$$

$$i_{gm} = -gm * \alpha \tau_D dP_L/dt = -\beta dP_L/dt \tag{9c}$$

The value of gm may operate to represent the gain of operational transconductance amplifier 314, V+ may operate to represent the inverting input of operational transconductance amplifier 314, V− may operate to represent the non-inverting input of operational transconductance amplifier 314. V+ may be configured to receive the output of operational transconductance amplifier 314, as denoted by $V_{AD}$. V− may be configured to receive electrical ground. The constant β may operate to represent $gm * \alpha \tau_D$.

Integrator circuit 270 includes an operational amplifier 318 and a capacitor 320. Inverting input of operational amplifier 318 may be configured to receive signal 282 supplied from output terminal of operational amplifier 314 and from a first terminal of capacitor 320. Non-inverting input of operational amplifier 318 may be configured for connection with electrical ground via a signal 322. A second terminal of capacitor 320 may be configured to receive signal 284 supplied by output terminal of operational amplifier 318. Signal 284 may be configured for external connections to integrator circuit 270.

Integrator circuit 270 may operate as an analog integrator. The capacitance value of capacitor 320 may be denoted as $C_{AI}$. The following equations may operate to describe the operation of integrator circuit 270:

$$V_{AI} = -1/C_{AI}(\int i_{gm} dt) = 1/C_{AI}[\int(\beta dP_L/dt)dt] = \gamma[\int(dP_L/dt) dt] \quad (10a)$$

$$V_{AI} = \gamma \int dP_L \quad (10b)$$

Variable $V_{AI}$ may operate to describe the output voltage of integrator circuit 270 and constant $\gamma$ may be consider as equal to $\beta/C_{AI}$. The constant $\beta$ was previously described as being equal to $gm*\alpha\tau_D$.

Equation (10a) may operate to provide an indication of an increasing value for variable $V_{AI}$ over time when power generator 202 (FIG. 2) operates to the left of dashed line 124 (FIG. 1) where $dP_L/dt>0$. Furthermore, the voltage supplied by integrator circuit 270, denoted as $V_{AI}$, increases over time until reaching the point of MPP where $dP_L/dt=0$. Furthermore, after reaching MPP, the voltage supplied by integrator circuit 270 may decrease over time if the operation of power generator 202 continues to move beyond the point of MPP and into operation where $dP_L/dt<0$. The accumulative or historical effect of the direction of the time rate of change for the electrical power dissipated by resistive load 210 (FIG. 2) as denoted by $dP_L/dt$ dictates the movement of the output of integrator circuit 270, not just the direction of the time rate of change at any particular point in time.

The positive and negative maximum values for the variable $V_{AI}$ may be derived from equation (10b) as:

$$V_{AI-POS-MAX} = \gamma P_{L-MAX} \quad (11a)$$

$$V_{AI-NEG-MAX} = -\gamma P_{L-MAX} \quad (11b)$$

Constants $V_{AI-POS-MAX}$ and $V_{AI-NEG-MAX}$ may operate to represent the positive and negative maximum output voltages provided by integrator circuit 270, respectively and constant $P_{L-MAX}$ may operate to represent the maximum amount of power dissipated by resistive load 210 (FIG. 2).

Differential amplifier circuit 272 includes an operational amplifier 324, a resistor 326, a resistor 328, a resistor 330, a resistor 332 and an independent voltage reference 334. Inverting input of operational amplifier 324 may be configured to receive a signal 327 connected to a first terminal of resistor 326 and to a first terminal of resistor 328. A second terminal of resistor 326 may be configure to receive signal 284 generated by an output terminal of operational amplifier 318. Second terminal of resistor 328 may be configured to receive signal 286 generated by output terminal of operational amplifier 324. Non-inverting input of operational amplifier 324 may be configured to receive a signal 340 connected to a first terminal of resistor 330. A second terminal of resistor 330 may be configured to receive a signal 338 connected to independent voltage reference 334 and a first terminal of resistor 332. A second terminal of resistor 332 may be connected to electrical ground via a signal 336.

The value of independent voltage reference 334 may be denoted as $V_{CCDA}$. $V_{CCDA}$ may be generated or supplied by power generator 202 through, for example, a voltage reference circuit or a voltage regulator circuit. The output voltage of operational amplifier 324 may be denoted as $V_{DA}$ and may be described by the following:

$$V_{DA} = V_{CCDA} - V_{AI} = V_{CC} - \gamma[\int(dP_L/dt)dt] \quad (12a)$$

$$V_{DA} = V_{CCDA} - V_{AI} = V_{CC} - \gamma \int dP_L \quad (12b)$$

Equation (12a) may operate to provide an indication for the output voltage of differential amplifier circuit 272, as denoted by $V_{DA}$, decreases until reaching MPP (i.e. $dP_L/dt=0$) when power generator 202 (FIG. 2) operates on the left side of dashed line 124 (FIG. 1) and operation increases upwards on dashed power function 110 (FIG. 1). Furthermore, after reaching MPP, $V_{DA}$ may increase if the operation of power generator 202 (FIG. 2) continues moving downwards on dashed power function 110 (FIG. 1) (i.e. $dP_L/dt<0$). The maximum and minimum values for $V_{DA}$ may be derived from equations (12b), (11 a) and (11b) and may be described as follows:

$$V_{DA-MAX} = V_{CCDA} + \gamma P_{L-MAX} \quad (13a)$$

$$V_{DA-MIN} = V_{CCDA} - \gamma P_{L-MAX} \quad (13b)$$

As may be observed from equation (13b), in order for the output voltage of differential amplifier circuit 272 to remain positive, $V_{CCDA}$ may operate to be greater in value than $\gamma P_{L-MAX}$.

Voltage-to-frequency converter circuit 274 includes a P-channel MOSFET 342, a N-channel MOSFET 344, a resistor 346, a capacitor 348, a resistor 350, a resistor 352, a high comparator 354, a low comparator 356 and an R/S flip-flop circuit 358. A source terminal of P-channel MOSFET 342 may be configured for connection to a power supply voltage 363, denoted as VCC, via a signal 364. A drain terminal of P-channel MOSFET 342 may be configured for connection to a drain terminal of N-channel MOSFET 344 and to a first terminal of resistor 346 via a signal 362. A gate of P-channel MOSFET 342 may be configured for connection to a gate terminal of N-channel MOSFET 344 and to output terminal /Q of R/S flip-flop circuit 358 via signal 288. A source terminal of N-channel MOSFET 344 may be connected to electrical ground and to a first terminal of capacitor 348 via a signal 360. Second terminal of resistor 346 may be connected to a second terminal of capacitor 348, non-inverting input of high comparator 354 and inverting input of low comparator 356 via a signal 366. Inverting input of high comparator 354 may be connected to a first terminal of resistor 350 and to output terminal of operational amplifier 324 of differential amplifier circuit 272 via signal 286. A second terminal of resistor 350 may be connected to a non-inverting terminal of low comparator 356 and to a first terminal of resistor 352 via a signal 368. A second terminal of resistor 352 may be connected to electrical ground via a signal 369. An R input terminal of R/S flip-flop circuit 358 may be configured to receive a signal 370 generated from output terminal of high comparator 354. An S input terminal of R/S flip-flop circuit 358 may be configured to receive a signal 372 generated from output terminal of low comparator 356.

Voltage-to-frequency converter circuit 274 may operate for charging and discharging a circuit and include a comparator for determining thresholds for charging and discharging. The charging and discharging portion of the circuit include P-channel MOSFET 342, N-channel MOSFET 344, resistor 346 and capacitor 348. Resistor 346 may have a value for resistance as denoted by $R_{VF}$. Capacitor 348 may have a value for capacitance as denoted by $C_{VF}$. The comparator circuit includes resistor 350, resistor 352, high comparator 354 and low comparator 356. Resistor 350 and resistor 352 may operate to function as a voltage divider. Resistor 350 may have a value for resistance denoted as $R_{CM1}$ and resistor 352 may have a value for resistance denoted as $R_{CM2}$. The output voltage of differential amplifier circuit 272, as denoted by $V_{DA}$, may operate to supply the resistor divider comprised of resistor 350 and resistor 352. The voltage $V_{DA}$ may be applied to first terminal of resistor 350 of resistor divider and also to the inverting input of high comparator 354. The output voltage of the resistor divider as denoted by signal 368 may be applied to the non-inverting input of low comparator 356 with a value as determined by $V_{DA}R_{CM2}/(R_{CM1}+R_{CM2})$.

The operation of voltage-to-frequency converter circuit 274 will be described in the discussion to follow. The voltage level of the /Q output of R/S flip-flop circuit 358 may operate to represent a value of zero, also commonly referred to as logic low. When the voltage level of the /Q output of R/S flip-flop circuit 358 presents a logic low, P-channel MOSFET 342 may be activated and N-channel MOSFET 344 may be inactivated. In this condition, capacitor 348 may be charged by power supply voltage 363 via resistor 346. The source for power supply voltage 363 may be derived from power generator 202 through, for example, a voltage regulator circuit. In a condition of initial charging of capacitor 348, the voltage experienced by capacitor 348, as denoted by $V_{CVF}$, may be described by the following:

$$V_{CVF}<V_{DA}R_{CM2}/(R_{CM1}+R_{CM2}), \quad (14a)$$

The right hand side of equation (14a) may be considered as the voltage applied to the non-inverting input of low comparator 356 in a condition of initial charging of capacitor 348. Equation (14a) may operate to indicate the output of low comparator 356, in this condition, as logic high and the output of high comparator 354 as logic low, since the voltage experienced on second terminal of capacitor 348 may also be considered the same as applied to the inverting input of low comparator 356 and to the non-inverting input of high comparator 354. As such, the R input terminal to R/S flip-flop circuit 358 may be considered a logic low and the S input terminal to R/S flip-flop circuit 358 may be considered a logic high, and as a result, the /Q output terminal of R/S flip-flop circuit 358 may operate to supply a logic low. The logic low on the /Q output terminal of R/S flip-flop circuit 358 may operate to continue activation of P-channel MOSFET 342 and inactivation of N-channel MOSFET 344, and as a result, capacitor 348 may continue to be charged by power supply voltage 363, denoted as $V_{CC}$, via resistor 346. The increasing charge applied to capacitor 348 may operate to increase the voltage, denoted as $V_{CVF}$, of capacitor 348. The value of $V_{CVF}$ eventually increases to a point above the value as determined by $V_{VG}R_{CM2}/(R_{CM1}+R_{CM2})$, and the description for the operation of the circuit may be designated as follows:

$$V_{DA}R_{CM2}/(R_{CM1}+R_{CM2})<V_{CVF}<V_{DA} \quad (14b)$$

Equation (14b) may operate to provide an indication of the output voltage of low comparator 356 transitions to logic low while the output voltage of high comparator 354 remains logic low. The R and S input terminals of R/S flip-flop circuit 358 may be considered as logic low and as a result the voltage supplied by the /Q output terminal for R/S flip-flop circuit 358 remains a logic low. In this condition, the P-channel MOSFET 342 remains activated and the N-channel MOSFET 344 remains inactivated and as a result capacitor 348 may operate to continue being charged by power supply voltage 363 via resistor 346 with the voltage realized by $V_{CVF}$ continuing to increase in value.

At some point, the value of $V_{CVF}$ increases above the value of $V_{DA}$ as described by:

$$V_{CVF}>V_{DA} \quad (14c)$$

Equation (14c) may operate to provide an indication of the output voltage supplied by high comparator 354 transitioning to a logic high, while the output voltage supplied by low comparator 356 remains a logic low. As a result, the R input of R/S flip-flop circuit 358 may receive a logic high and the S input of R/S flip-flop circuit 358 may receive a logic low, at which the /Q output of R/S flip-flop circuit 358 may operate to transition to a logic high. As a result of the /Q output of R/S flip-flop circuit 358 transitioning to a logic high, P-channel MOSFET 342 may operate to transition to inactivated and N-channel MOSFET 344 may operate to transition to activated. As a result of P-channel MOSFET 342 transitioning inactive, capacitor 348 may operate to discharge to electrical ground via resistor 346, also resulting in the voltage $V_{CVF}$ decreasing in value. It may be observed that in order for the operation of capacitor 348 to be charged to a condition of satisfying the conditions of equation (13a), the value of voltage $V_{CC}$ may be configured for a greater value than the value as denoted by $V_{DA-MAX}$. At some point, the value of voltage $V_{CVF}$ may operate to decrease such that equation (14b) may describe operation of the circuit, since the R and S input terminals of R/S flip-flop circuit 358 may operate to remain a logic low resulting in the /Q output terminal of R/S flip-flop circuit 358 continuing to supply a logic high condition. In this condition, capacitor 348 may operate to continue being discharged to electrical ground via resistor 346 with a continuation in the decrease in the value of voltage $V_{CVF}$.

At some point, the value $V_{CVF}$ may operate to decrease such that the conditions of equation (14a) may be applicable with the R input terminal of R/S flip-flop circuit 358 transitioning to logic low and the S input terminal of R/S flip-flop circuit 358 transitioning to logic high with the result of the /Q output terminal of R/S flip-flop circuit 358 transitioning to logic low. The /Q output terminal of R/S flip-flop circuit 358 transitioning to logic may operate to inactivate P-channel MOSFET 342 and activate N-channel MOSFET 344. As a result, capacitor 348 may operate to return to a condition of charging. The cycle of operations as previously discussed, may then operate to continue in a repetitive fashion.

As a result of the previous discussion, it may be observed that the voltage applied to capacitor 348, denoted as $V_{CVF}$, may operate to oscillate between the values of $V_{DA}R_{CM2}/(R_{CM1}+R_{CM2})$ and $V_{DA}$. The time for voltage $V_{CVF}$ of capacitor 348 to increase from $V_{DA}R_{CM2}/(R_{CM1}+R_{CM2})$ to $V_{DA}$ may be denoted as $t_{CHA}$. Furthermore, the time for voltage $V_{CVF}$ of capacitor to decrease from $V_{DA}$ to $V_{DA}R_{CM2}/(R_{CM1}+R_{CM2})$ may be denoted as $t_{DIS}$. The values of $t_{CHA}$ and $t_{DIS}$ may operate to describe the durations for the logic low and logic high durations of the /Q output terminal of R/S flip-flop circuit 358. The /Q output terminal of R/S flip-flop circuit 358 may operate as a square wave with the duration of a logic low interval described by $t_{CHA}$ and the duration of a logic high interval described by $t_{DIS}$.

It can be shown that charging time $t_{CHA}$ and discharging time $t_{DIS}$ may be described as follows:

$$t_{CHA}=R_{VF}C_{VF}\ln\{[V_{CC}-V_{DA}R_{CM2}/(R_{CM1}+R_{CM2})]/[V_{CC}-V_{DA}]\} \quad (15a)$$

$$t_{DIS}=R_{VF}C_{VF}\ln(1+R_{CM1}/R_{CM2}) \quad (15b)$$

Furthermore, the time period for the cycle of charging and discharging as previously discussed, as well as the time period for the square wave generated by the /Q output of R/S flip-flop circuit 358, as denoted by $t_{VFC}$, may be described as:

$$t_{VFC}=t_{CHA}+t_{DIS}=R_{VF}C_{VF}\ln\{[(1+R_{CM1}/R_{CM2})V_{CC}-V_{DA}]/[V_{CC}-V_{DA}]\} \quad (16a)$$

Equation (16a) may operate to indicate the period of the square wave generated on the /Q output terminal of R/S flip-flop circuit 358 may be considered as a function of the voltage $V_{DA}$ provided by differential amplifier circuit 272. Furthermore, the operation of VDA, as shown in equations (12a) and (12b) may operate as a function of the state of power generator 202 (FIG. 2), where the state of power generator 202 (FIG. 2) depends on the operation of power generator 202 (FIG. 2) with respect to MPP and dashed power function 110 as discussed previously with respect to FIG. 1.

Equation (16a) may be re-written or rearranged as follows:

$$t_{VFC}=R_{VF}C_{VF}\ln\{[(1+R_{CM1}/R_{CM2})V_{CC}-\gamma(\int(dP_L/dt)dt)]/[V_{CC}-\gamma(\int(dP_L/dt)dt)]\} \quad (16b)$$

$$t_{VFC}=R_{VF}C_{VF}\ln\{[(1+R_{CM1}/R_{CM2})V_{CC}-\gamma\int dP_L]/[V_{CC}-\gamma\int dP_L]\} \quad (16c)$$

The frequency of the square wave generated by the /Q output terminal of R/S flip-flop circuit 358, denoted as $f_{VFC}$, may be described as:

$$f_{VFC}=(1/R_{VF}C_{VF})\ln\{[V_{CC}-V_{DA}]/[(1+R_{CM1}/R_{CM2})V_{CC}-V_{DA}]\} \quad (17)$$

In order to simplify the analysis for realizing further insights in to the operation of the circuit, resistor 350 and resistor 352 may be configured with an identical value for resistance, or $R_{CM1}=R_{CM2}$. As a result of this simplification, equation (17) may be simplified to:

$$f_{VFC}=(1/\tau_{VF})\ln[(V_{CC}-V_{DA})/(2V_{CC}-V_{DA})] \quad (18)$$

Equation (18) may operate to indicate $f_{VFC}$ increases in frequency with decreasing $V_{DA}$ and $f_{VFC}$ decreases in frequency with an increasing $V_{DA}$. As a result, $f_{VFC}$ may increase in frequency when power generator 202 (FIG. 2) operates on the left side of dashed line 124 (FIG. 1) or $dP_L/dt>0$ and an increasing operation of power generator 202 (FIG. 2) on dashed power function 110 (FIG. 1), until reaching MPP as denoted by point 120 (FIG. 1). Furthermore, after reaching MPP, $f_{VFC}$ may decrease in frequency as the operation of power generator 202 (FIG. 2) remains on the right side of dashed line 124 (FIG. 1) or $dP_L/dt<0$, and continues to follow dashed power function 110 (FIG. 1) in a downward fashion.

H-bridge driver circuit 276 includes a D flip-flop 374, a MOSFET driver 376 and a MOSFET driver 378. CLK input terminal of D flip-flop 374 may be configured to receive signal 288 generated by /Q output terminal of R/S flip-flop circuit 358. D input terminal of D flip-flop 374 may be configured to receive a signal 380 generated by a /Q output terminal of D flip-flop 374. A non-inverting input terminal of MOSFET driver 376 may be configured to receive signal 380 generated by /Q output terminal of D flip-flop 374. Inverting input terminal of MOSFET driver 376 may be configured to receive signal 220 generated from output terminal of MOSFET driver 376. Non-inverting input terminal of MOSFET driver 378 may be configured to receive a signal 382 generated by a Q output terminal of D flip-flop 374. Inverting input terminal of MOSFET driver 378 may be configured to receive signal 221 generated by output terminal of MOSFET driver 378.

D flip-flop 374 may be configured to divide the frequency of the signal generated by voltage-to-frequency converter circuit 274, denoted as $f_{VFC}$, by 2. As the output voltage supplied by the Q and /Q output terminals of D flip-flop 374 may operate to transition with the rising edge of the output signal generated by the voltage-to-frequency converter circuit 274, thereby providing an output signal from the Q and /Q output terminals of D flip-flop 374 with a 50% duty cycle. The output frequency of the signal supplied by the Q and /Q output terminals of D flip-flop 374 may be described as:

$$f_{HB}=f_{VFC}/2=(1/2\tau_{VF})\ln[(V_{CC}-V_{DA})/(2V_{CC}-V_{DA})] \quad (19)$$

The output signals generated by the Q and /Q output terminals of D flip-flop 374 may operate as square waves with a 50% duty cycle and with complimentary polarity. The Q and /Q output terminals of D flip-flop 374 may operate to control the operations of H-bridge circuit 204 (FIG. 2) via signal 220 and signal 221 sourced by MOSFET driver 376 and MOSFET driver 378, respectively. H-bridge circuit 204 may operate to be controlled by H-bridge driver circuit 276 such that transistor 246 and transistor 252 may be activated concurrently with an inactivated transistor 248 and transistor 250. Furthermore, H-bridge circuit 204 may operate to control H-bridge driver circuit 276 such that transistor 246 and transistor 252 may be inactivated concurrently with an activated transistor 248 and transistor 250. The frequency of the signals received by H-bridge circuit 204 may operate to be the same frequency as generated by the output signals of H-bridge driver circuit 276 and D flip-flop 374, as denoted by $f_{HB}$.

From equation (2b) and equation (4) the resistance for the primary winding of transformer 206 (FIG. 2) may be described as:

$$R_P=4\pi^2 f_{HB}^2 M^2 R_L/(R_L^2+4\pi^2 f_{HB}^2 L_S^2) \quad (20)$$

From equation (20), it may be observed that when power generator 202 (FIG. 2) operates on the left side of dashed line 124 (FIG. 1) where $dP_L/dt>0$, $R_P$ increases in value until the operation of power generator 202 (FIG. 2) reaches the condition of MPP denoted as point 120 (FIG. 1) where $dP_L/dt=0$. When the operation of power generator 202 (FIG. 2) reaches MPP, the resistance value of $R_P$ may be considered as equal to internal resistance 242 (FIG. 2) of power generator 202 (FIG. 2) resulting in maximum power transfer and efficiency for power system 200 (FIG. 2). Furthermore, when power generator 202 (FIG. 2) operates on the right side of dashed line 124 (FIG. 1) where $dP_L/dt<0$, $R_P$ may operate to decrease in value until the operation of power generator 202 (FIG. 2) reaches the condition of MPP denoted as point 120 (FIG. 1) where $dP_L/dt=0$, once again resulting in maximum power transfer and efficiency for power system 200 (FIG. 2). Hence, modifying the primary winding resistance of transformer 206 (FIG. 2) to match the internal resistance 242 (FIG. 2) of power generator 202 (FIG. 2) may be achieved via an automated or self regulated fashion.

It should be noted during the initial stage of operation of power generator 202 (FIG. 2), the output voltage of differential amplifier circuit 272 (FIG. 2), denoted as $V_{DA}$, may be considered as equal to $V_{CCDA}$ based on equation (12a) and equation (12b). As a result of this initial condition, voltage-to-frequency converter circuit 274 may operate to generate a signal with a square wave, resulting in a signal being supplied to transformer 206 (FIG. 2) via H-bridge driver circuit 276 and H-bridge circuit 204 (FIG. 2), further resulting in alternating current in transformer 206 (FIG. 2) during initial stages of operation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Detailed descriptions of the preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Those skilled in the art will readily recognize, in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

Having fully described at least one embodiment of the present invention, other equivalent or alternative methods for converting unregulated electrical energy generated by a renewable power generator to regulated electrical energy consumable by a load according to the present invention will be apparent to those skilled in the art. The invention has been described above by way of illustration, and the specific embodiments disclosed are not intended to limit the invention to the particular forms disclosed. For example, the particular implementation of voltage-to-frequency converter circuit 274 (FIG. 3) may vary depending upon the particular type of transistors used. The exemplary hardware implementations described in the foregoing were directed to renewable power supply implementations; however, similar techniques may be provide for other types of power supply devices such as but not limited to, electrical generators and batteries. Implementations of the present invention are contemplated as within the scope of the present invention. The invention is thus to cover all modifications, equivalents, and alternatives falling within the spirit and scope of the following claims.

Claim elements and steps herein may have been numbered and/or lettered solely as an aid in readability and understanding. Any such numbering and lettering in itself is not intended to and should not be taken to indicate the ordering of elements and/or steps in the claims.

What is claimed is:

1. An apparatus comprising:
means for receiving a sensed voltage of a voltage applied to a load resistance and a sensed current of a current passing through the load resistance where the voltage is a rectified voltage from a transformer's output whose input is from a DC-to-AC power converter being supplied from a DC power generator having an internal resistance, said means being operable to output a product of the sensed voltage and the sensed current;
means for receiving the product and operable for outputting a rate of change of the product;
means for receiving the rate of change and operable for outputting an integrated voltage indicating an accumulative rate of change of the product;
means for receiving the integrated voltage and operable for generating a voltage waveform having a frequency determined by the integrated voltage; and
means for receiving the voltage waveform and operable for using the voltage waveform to output a control signal for controlling a frequency of the DC-to-AC power converter where the apparatus substantially matches an input resistance of the transformer to the internal resistance, thereby maximizing power transfer to the load resistance.

2. The apparatus as recited in claim 1, further comprising means for coupling the rate of change to said means for outputting an integrated voltage.

3. The apparatus as recited in claim 1, further comprising means for coupling the integrated voltage waveform to said means for using the voltage waveform to output a control signal.

4. An apparatus comprising:
a multiplier circuit operable for receiving a sensed voltage of a voltage applied to a load resistance and a sensed current of a current passing through the load resistance where the voltage is a rectified voltage from a transformer's output whose input is from a DC-to-AC power converter being supplied from a DC power generator having an internal resistance, said multiplier being further operable to output a product of the sensed voltage and the sensed current;
a differentiator circuit coupled to said multiplier circuit and operable for outputting a rate of change of the product;
an integrator circuit coupled to said differentiator circuit and operable for outputting an integrated voltage indicating an accumulative rate of change of the product;
a voltage-to-frequency converter circuit coupled to said integrator circuit and operable for generating a voltage waveform having a frequency determined by the integrated voltage; and
a driver circuit coupled to said voltage-to-frequency converter circuit and operable for using the voltage waveform to output a control signal for controlling a frequency of the DC-to-AC power converter where the apparatus substantially matches an input resistance of the transformer to the internal resistance, thereby maximizing power transfer to the load resistance.

5. The apparatus as recited in claim 4, further comprising a transconductance amplifier circuit for coupling said differentiator circuit to said integrator circuit.

6. The apparatus as recited in claim 4, further comprising a differential amplifier circuit for coupling said integrator circuit to said voltage-to-frequency converter circuit.

7. The apparatus as recited in claim 4, in which said multiplier circuit, said differentiator circuit and said an integrator circuit comprise analog circuitry.

8. The apparatus as recited in claim 5, in which said transconductance amplifier comprises analog circuitry.

9. The apparatus as recited in claim 6, in which said differential amplifier circuit comprises analog circuitry.

10. The apparatus as recited in claim 4, in which said voltage-to-frequency converter circuit and said driver circuit comprises digital circuitry.

11. The apparatus as recited in claim 4, in which said driver circuit comprises at least two outputs for control of an H-bridge type DC-to-AC power converter.

12. A system comprising:
a DC-to-AC power converter operable for receiving DC power from a power generator having an internal resistance and operable for outputting an AC power;
a transformer coupled to said DC-to-AC power converter and operable for outputting a transformed AC power;
a rectifier circuit coupled to said transformer and operable for outputting a rectified transformed AC power for application to a load resistance;
means for sensing a voltage on the load resistance and outputting the sensed voltage;
means for sensing a current through the load resistance and outputting the sensed current;
a multiplier circuit operable for receiving the sensed voltage and the sensed current, said multiplier being further operable to output a product of the sensed voltage and the sensed current;
a differentiator circuit coupled to said multiplier circuit and operable for outputting a rate of change of the product;
an integrator circuit coupled to said differentiator circuit and operable for outputting an integrated voltage indicating an accumulative rate of change of the product;
a voltage-to-frequency converter circuit coupled to said integrator circuit and operable for generating a voltage waveform having a frequency determined by the integrated voltage; and
a driver circuit coupled to said voltage-to-frequency converter circuit and operable for using the voltage waveform to output a control signal for controlling a frequency of said DC-to-AC power converter where the system substantially matches an input resistance of said transformer to the internal resistance, thereby maximizing power transfer to the load resistance.

13. The apparatus as recited in claim 12, further comprising a transconductance amplifier circuit for coupling said differentiator circuit to said integrator circuit.

14. The apparatus as recited in claim 12, further comprising a differential amplifier circuit for coupling said integrator circuit to said voltage-to-frequency converter circuit.

15. The apparatus as recited in claim 12, in which said multiplier circuit, said differentiator circuit and said an integrator circuit comprise analog circuitry.

16. The apparatus as recited in claim 13, in which said transconductance amplifier comprises analog circuitry.

17. The apparatus as recited in claim 14, in which said differential amplifier circuit comprises analog circuitry.

18. The apparatus as recited in claim 12, in which said voltage-to-frequency converter circuit and said driver circuit comprises digital circuitry.

19. The apparatus as recited in claim 12, in which said DC-to-AC power converter comprises a H-bridge.

20. The apparatus as recited in claim 19, in which said driver circuit comprises at least two outputs for control of said H-bridge.

* * * * *